United States Patent [19]

Mizuno et al.

[11] Patent Number: 5,066,957

[45] Date of Patent: Nov. 19, 1991

[54] HYBRID MODULATION SATELLITE COMMUNICATION SYSTEM

[75] Inventors: Toshio Mizuno, Sayama; Takuro Muratani, Noda; Yasuhiko Ito, Tokyo; Tatsuo Watanabe, Tokyo; Takashi Inoue, Tokyo, all of Japan

[73] Assignee: Kokusai Denshin Denwa Co., Ltd., Tokyo, Japan

[21] Appl. No.: 511,681

[22] Filed: Apr. 20, 1990

[30] Foreign Application Priority Data

Apr. 21, 1989 [JP] Japan .................................. 1-99936
Jan. 23, 1990 [JP] Japan .................................. 2-11926

[51] Int. Cl.⁵ ...................... H04B 7/005; H04B 7/185
[52] U.S. Cl. ...................................... 342/352; 455/13; 455/69
[58] Field of Search ................ 455/69, 67, 17, 12, 455/13; 332/108, 119; 375/42, 46, 79, 122; 342/352

[56] References Cited

U.S. PATENT DOCUMENTS

| | | | |
|---|---|---|---|
| 3,800,245 | 3/1974 | Basu | 332/108 |
| 4,228,538 | 10/1980 | Scharla-Nielsen et al. | 455/69 X |
| 4,418,350 | 11/1983 | Rosen | 342/359 |
| 4,426,711 | 1/1984 | Huriau | 375/122 X |
| 4,455,651 | 6/1984 | Baran | 370/104 |
| 4,567,485 | 1/1986 | Oshima et al. | 342/358 |
| 4,731,866 | 3/1988 | Muratani et al. | 455/69 X |
| 4,910,792 | 3/1990 | Takahata et al. | 455/69 X |

Primary Examiner—Jr. Barr',acu/o/ n
Attorney, Agent, or Firm—Armstrong, Nikaido, Marmelstein, Kubovcik & Murray

[57] ABSTRACT

In a satellite communication system including a plural small earth stations (3-8), a relay earth station (2) and a satellite (1), information transmission is undertaken by primary modulation of carrier wave, and transmission of operation status of each small earth station (3-8) is carried out by secondary modulation of said carrier wave. Primary modulation may be BPSK or multiphase PSK (MPSK), and secondary modulation may be PSK, ASK or FSK. Said operation status may be receive signal quality in each small earth station, and the relay earth station (2) may adjust transmit power to said small earth station such that the receive signal quality at small earth stations satisfies desired criteria irrespective of rain attenuation.

11 Claims, 9 Drawing Sheets

BPSK PHASE DIAGRAM

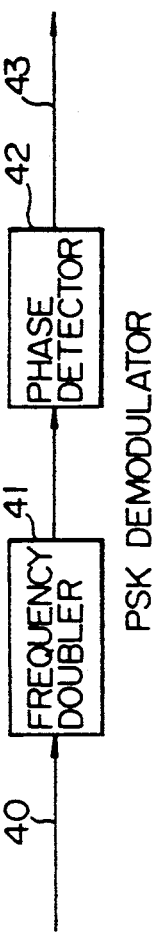
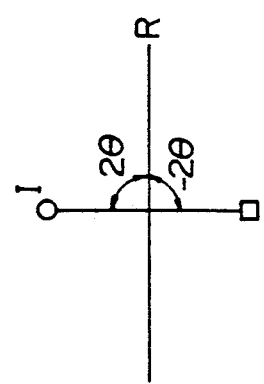
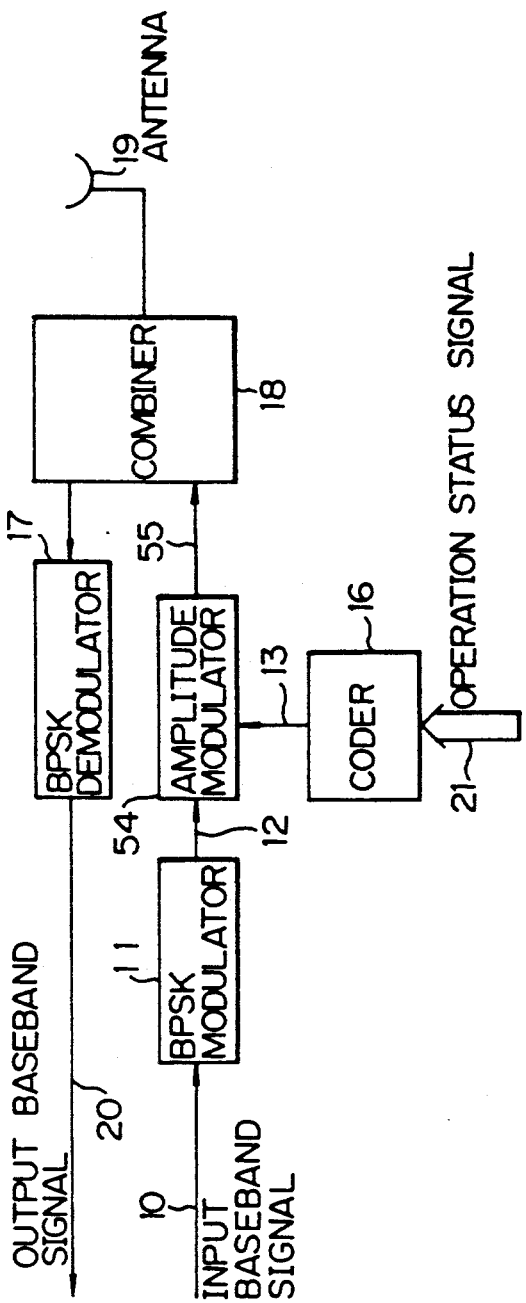

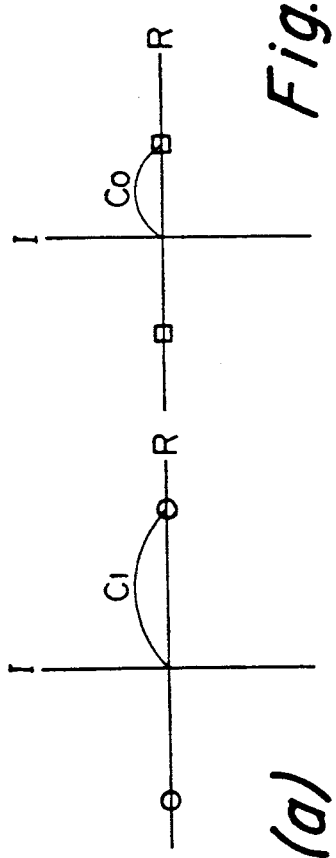
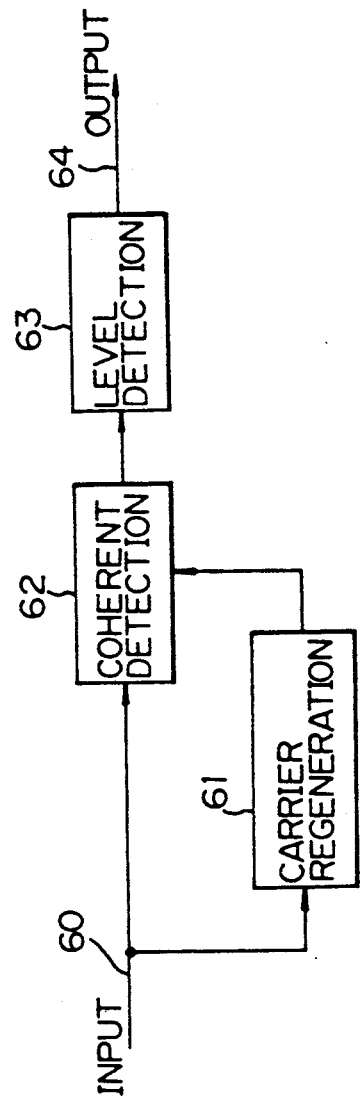
Fig. 7(a) Fig. 7(b)
BPSK-ASK PHASE-VECTOR
Fig. 8

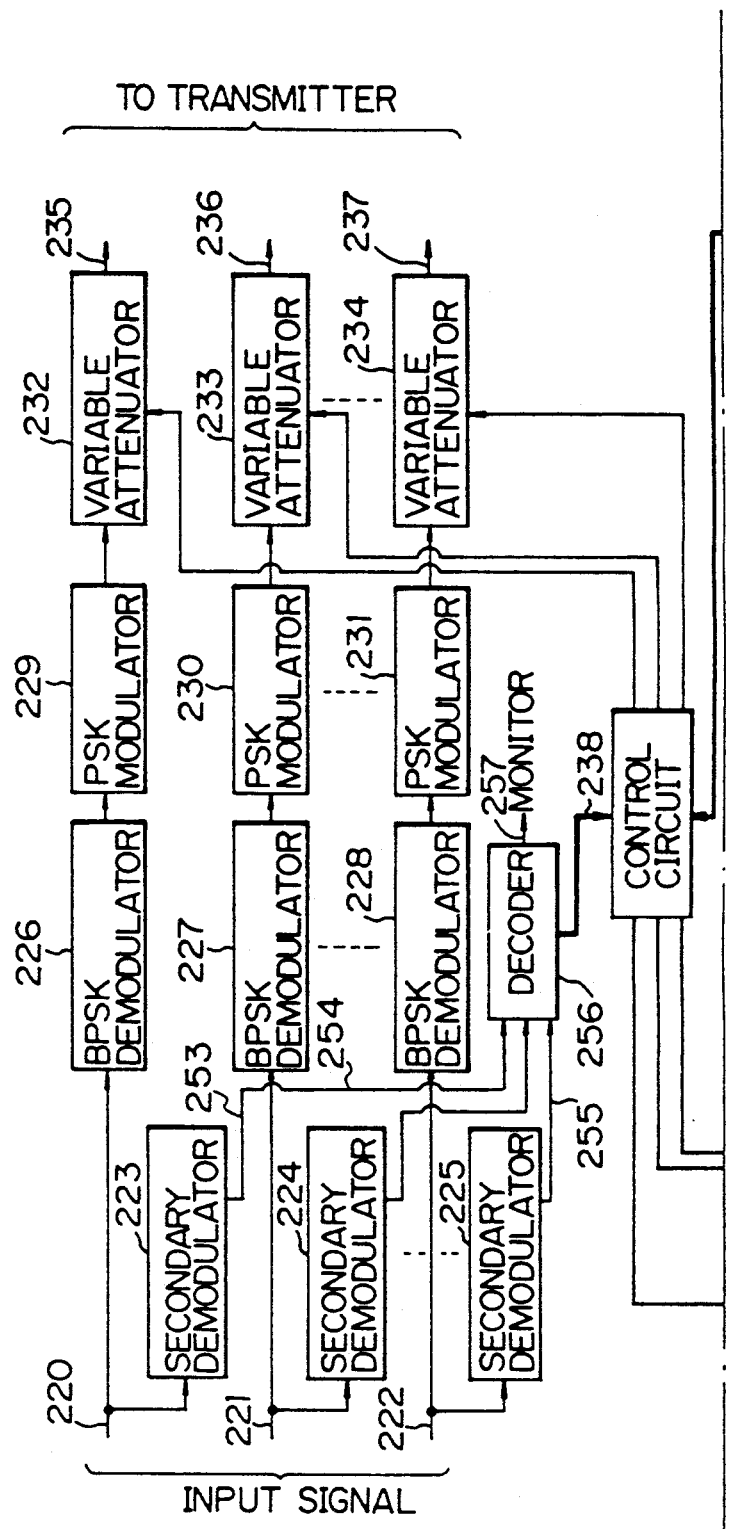

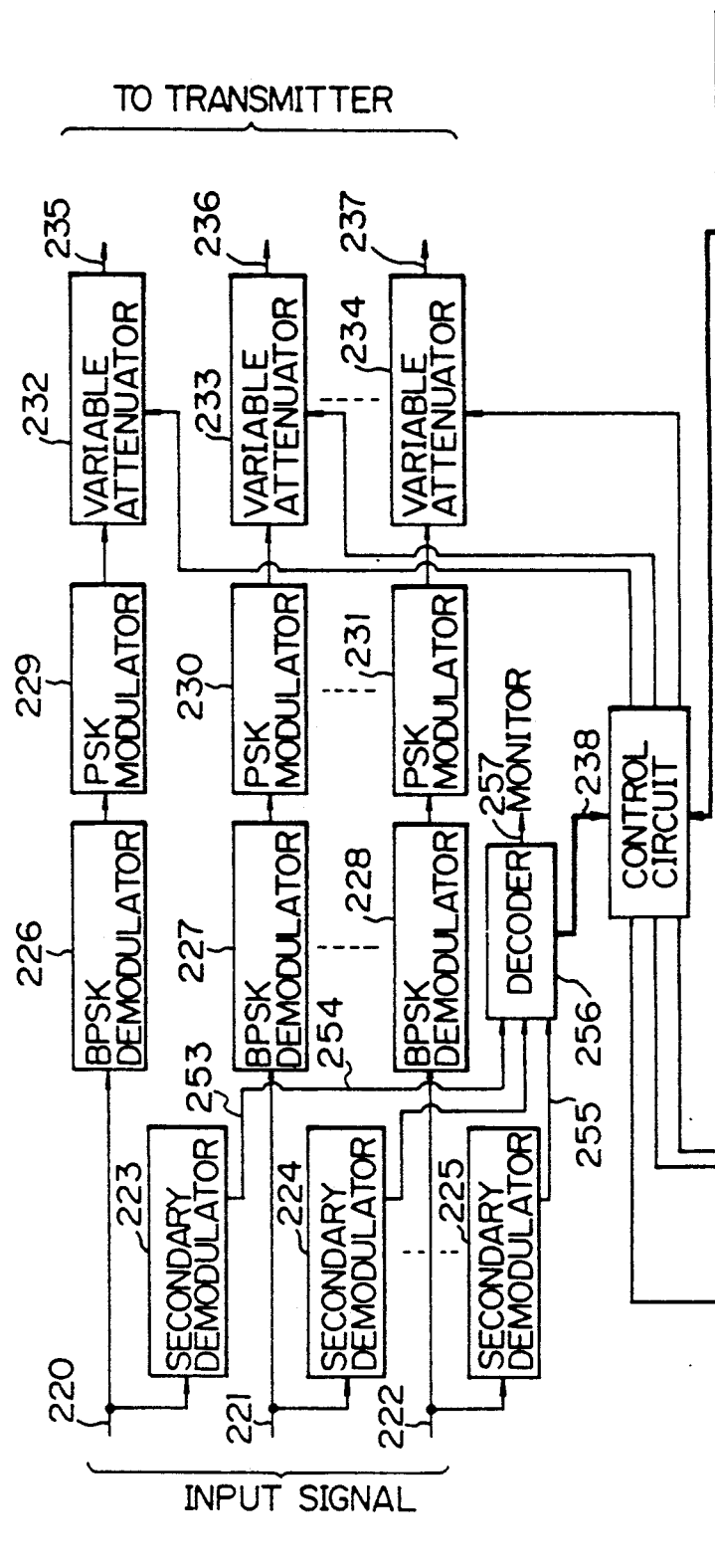

HYBRID MODULATION SATELLITE COMMUNICATION SYSTEM

BACKGROUND OF THE INVENTION

The present invention relates to a satellite communication system between small earth stations, in particular, relates to a satellite communication system using hybrid modulation which may monitor operation status of those earth stations in such a satellite communication system. The present invention is used for transmit power control by a large relay earth station such that rain attenuation due to rain attenuation sustained by small earth stations is compensated for.

A small earth station has been used currently in a satellite communication system, following the use of a large communication satellite, the development of digital communication systems, and/or the development of communication components. In a satellite communication system with a plural small earth stations, it is desirable to monitor the operation status of each earth station in a unified manner by a monitor station for effective and reliably operation of the communication system, and/or unattended operation of a small earth station. The monitored information is also used for transmitting power control by a monitor station for compensating for rain attenuation at small earth station side.

The transmission of monitor information has been carried out through a communication channel itself, or through a specific control channel dedicated for transmission of monitor information. For instance, when a circuit is a TDMA circuit, said monitor information, including bit error rate, C/N (carrier to noise power ratio) of receive signal et al, is inserted in a preamble portion of the TDMA signal. When the circuit handles continuous signal, the signal is transmitted by using frame structure of signal, and said monitor information is inserted at a header portion of the frame.

However, those monitor information transmission systems have the disadvantages that the signal processing is complicated, and the large amount of attachments to a conventional communication system are necessary for the transmission of monitor information, since the structure of a communication circuit itself must be changed.

SUMMARY OF THE INVENTION

It is an objective of the present invention to overcome the disadvantages and limitations of a perceived satellite communication system by providing a new and improved satellite communication system.

It is an objective of the present invention to overcome the disadvantages and limitations of a perceived satellite communication system by providing a new and improved satellite communication system.

It is also an objective of the present invention to provide a monitoring system in a satellite communication system in which monitoring information is transmitted through hybrid modulation.

It is also an objective of the present invention to provide a transmit power control system in a satellite communication system by using monitor information of operation of a small earth station for compensation of rain attenuation.

The above and other objective are attained by a satellite communication with monitoring facility of operation of small earth stations comprising; a satellite (1); a relay earth station (2); plural small earth stations (3-8) connected to each other through said satellite (1) and said relay earth station (2); each of said small earth stations (3-8) having a primary modulator for modulating carrier wave by an information signal to be transmitted; said relay earth station (2) having a primary demodulator for demodulating received information from small earth stations, and a modulator for modulating thus demodulated signal to transmit to said satellite (1) for relay purpose; at least one of said small earth stations (3-8) having a secondary modulator for secondary modulation of output of said primary modulator by operation status signal available in small earth station; and said relay earth station (2) further having a secondary demodulator for demodulating the output of said primary demodulator to obtain operation status of a small earth station.

BRIEF DESCRIPTION OF THE DRAWINGS

The foregoing and other objective, features, and attendant advantages of the present invention will be appreciated as the same become better understood by means of the following description and accompanying drawings wherein;

FIG. 4 is a block diagram of second demodulator according to the present invention, FIG. 5 shows the operation of the second demodulator of FIG. 4, FIG. 6 is a block diagram of another small earth station according to the present invention, FIGS. 7(A) and 7(B) are phase-vector diagrams which show the operation of the secondary modulator 54 in FIG. 6, FIG. 8 is a block diagram of another secondary demodulator which is used with the small earth station of FIG. 6, FIGS. 13(A) and 13(B) are block diagrams of a relay earth station in the satellite communication system according to the present invention.

EMBODIMENT 1

Figure 1:
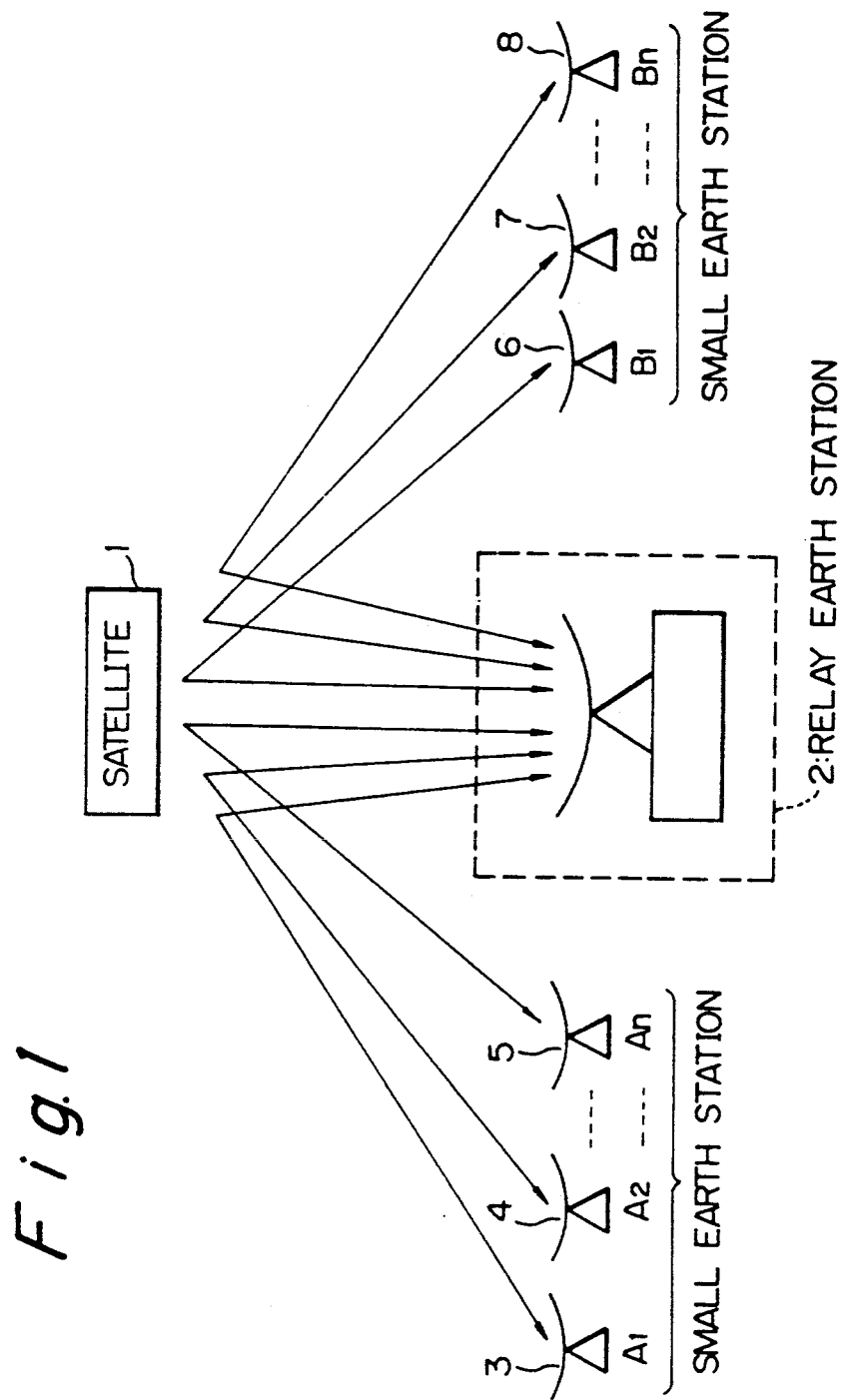
FIG. 1 is a block diagram of a satellite communication system which is used in the present invention.

FIG. 1 shows a block diagram of a satellite communication system having a relay earth station and plural small earth stations. In FIG. 1, the communication is achieved between small earth stations through the satellite 1 and the relay earth station 2. Further, the communication between the relay earth station 2 and one of the small earth stations is also carried out through the satellite 1. In FIG. 1, the relay earth station 2 monitors the operation status of all the small earth stations 3-8 through the satellite 1. The link from an earth station to a satellite is called an up-link, and the one from a satellite to an earth station is called a down-link. It is assumed that the communication among the earth stations has undergone through frequency division multiplex access.

The relay earth station 2 receives the signals from the small earth stations 3-8 through the satellite, demodulates each signal independently, and then, (1) the demodulated signal is forwarded to a host computer or a data base available in the relay earth station, or (2) the demodulated signal is forwarded to the satellite 1 again after the signal is re-modulated. The relay earth station 2 plays a role of not only a relay station, but also a terminal station or a monitor station for monitoring the operation and/or maintenance of small earth stations 3-8.

Figure 2:
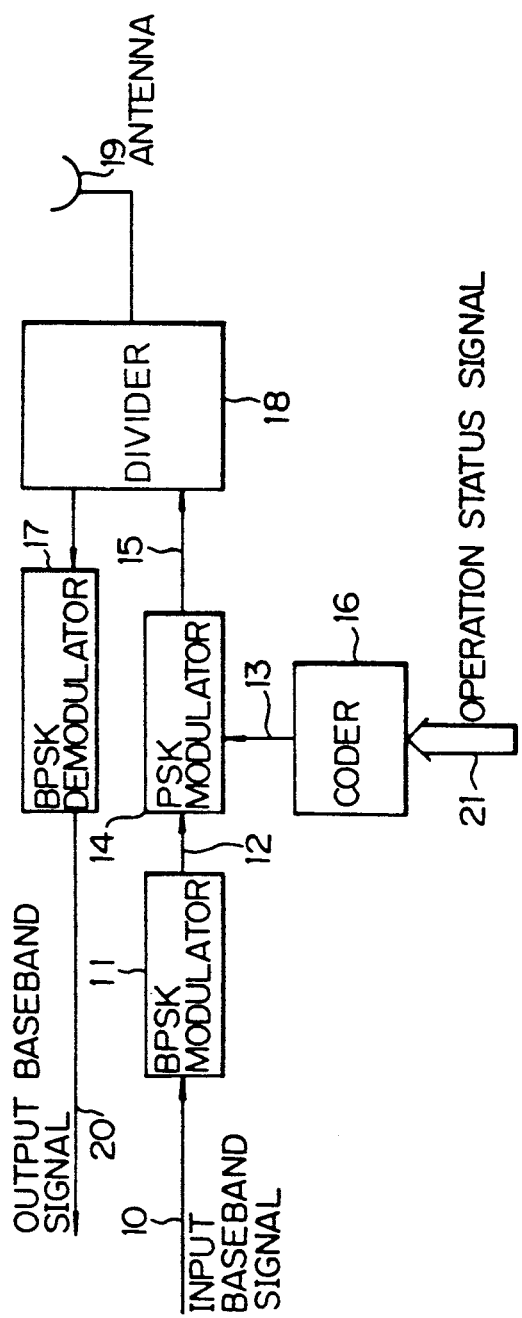
FIG. 2 is a block diagram of a small earth station according to the present invention.

FIG. 2 shows a block diagram of a small earth station, in which the primary modulation is BPSK (binary digital phase shift modulation), and the secondary modulation is PSK of $\pm\theta°$. $\theta$ is for instance 45°. As for the primary modulation, not only BPSK, but also multi-PSK is possible.

In FIG. 2, the numeral 10 is digital baseband signal including voice, data and/or facsimile signal, 11 is a primary modulator by a BPSK modulator, 12 is an output of the same, 13 is a digital baseband signal for secondary modulation showing operation status of its own small earth station, 14 is a secondary modulator by a PSK modulator for providing phase shift of $\pm\theta°$ based upon the signal 13, 15 is an output of the PSK modulator 14, and 16 is an encoder for providing a secondary modulation signal which consists of framed operation status signals. The secondary digital baseband signal 13 carries operation status information which is for instance a receive C/N ratio (carrier to noise power ratio) in a small earth station, signal quality (bit error rate), signal level of transmit and/or receive signal, power supply voltage, and/or operation temperature. It should be appreciated that the bit rate of said secondary digital baseband signal 13 is considerably lower than that of the primary digital baseband signal.

The numeral 17 in FIG. 2 is a BPSK demodulator, 18 is a divider, 19 is an antenna, and 20 is a received baseband signal. The input baseband signal 10 is first modulated by the BPSK modulator 11, and the output of which is applied to the secondary modulator 14, which carries out the secondary modulation to the carrier wave of the output of the first modulator 11. Thus, the hybrid modulation signal which carries both the information of the baseband signal, and the operation status of the station is obtained. The output of the secondary modulator 14 is forwarded to the satellite through the antenna 19, and the divider 18 which divides the transmit signal and the receive signal. The receive signal by the antenna 19 is fed to the demodulator 17 through the divider 18.

It should be appreciated that the salient feature in FIG. 2 is the presence of secondary modulator 14 at the output of the primary modulator.

Both the divider 18 and the demodulator 17 may be removed, when a small earth station functions merely as a transmit station.

Figure 3:
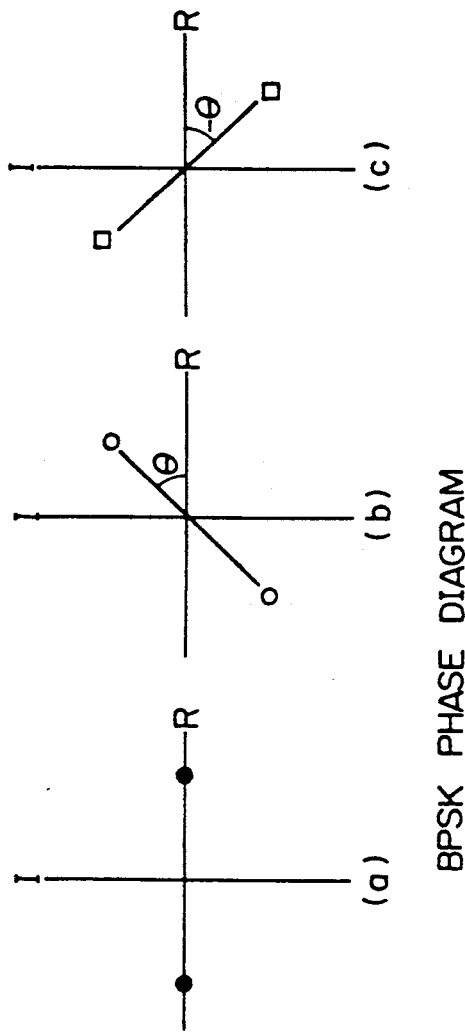
FIG. 3 shows phase-vector curves of BPSK-PSK hybrid modulation signal.

FIGS. 3a through 3c show a phase-vector diagram of the modulated signal, in which the horizontal axis is real axis and the vertical axis is imaginary axis. FIG. 3a shows the output 12 of the BPSK modulator 11, FIG. 3b and FIG. 3c show the output 15 of the PSK modulator 14 when the baseband signal 13 is 1 and 0, respectively. The PSK modulator 14 modulates the BPSK signal which is (0, 180°) into ($\pm\theta°$, 180°+$\theta°$) when the secondary baseband signal 13 is "1", and ($-\theta°$, 180°-$\theta°$) when the secondary baseband signal 13 is "0". The PSK signal 15 which is hybrid-modulated is forwarded from each small earth station 3-8 in FIG. 1 to a relay earth station 2.

FIG. 4 is a block diagram of a PSK demodulator installed in a relay earth station 2 for demodulating the secondary demodulation for deriving monitoring information of operation status of small earth stations. In the Figure, the numeral 40 is an input signal, 41 is a frequency doubler, 42 is a phase detector which may be composed of a phase lock loop (PLL), and 43 is an output of the phase detector 42. The input signal 40 is either the signal of FIG. 3b or that of FIG. 3c. The output of the frequency doubler 41 is $+2\theta$, or $-2\theta$ as shown in FIG. 5, depending upon 1 or 0 of the operation status of the small earth station (it is assumed $\theta=45°$). And, the phase detector 42 provides the operation status output signal 43 depending upon whether said signal is $+\theta$ or $-\theta$.

As an alternative, when an operation status signal is differentially encoded, a differential phase detector is used instead of a phase detector 42.

EMBODIMENT 2

FIG. 6 shows another block diagram of a small earth station in which primary modulation is BPSK, and secondary modulation is ASK (digital amplitude modulation). The numeral 54 is an amplitude modulator, 55 is an output of the amplitude modulator 54, and other numerals in FIG. 6 are the same as those in FIG. 2. The primary modulation is not restricted to BPSK, but multi-PSK is possible.

FIG. 7 shows the phase vector diagram of the output signal 55 of the amplitude modulator 54. When the baseband signal 13 for secondary modulation is "1", the BPSK signal with the amplitude C1 as shown in FIG. 7a is used, and when the baseband signal 13 is "0", the BPSK signal with the amplitude C0 as shown in FIG. 7b is used. Thus, the ASK modulator 54 modulates the BPSK signal by using the amplitude C1 or C0, and the hybrid modulation signal is transmitted to the relay earth station 2.

FIG. 8 is a block diagram of an ASK demodulator installed in the relay earth station for the secondary demodulator. In the Figure, the numeral 60 is a hybrid modulation signal from a small earth station, 61 is a carrier regenerator for deriving carrier component in an input signal 60, 62 is a phase detector for detecting operation status of a small earth station by using the regenerated carrier in the circuit 61, and 63 is a level detector for detecting level of an output signal of the phase detector 62. The output signal 64 of the level detector 63 is proportional to C1 or C0 in FIG. 7, and therefore, the demodulation of the ASK secondary modulated digital baseband signal is made.

As a modification, the carrier regenerator 61 and the phase detector 62 in FIG. 8 may be removed. In that case, the demodulator operates as an asynchronous ASK demodulator.

EMBODIMENT 3

Figure 9:
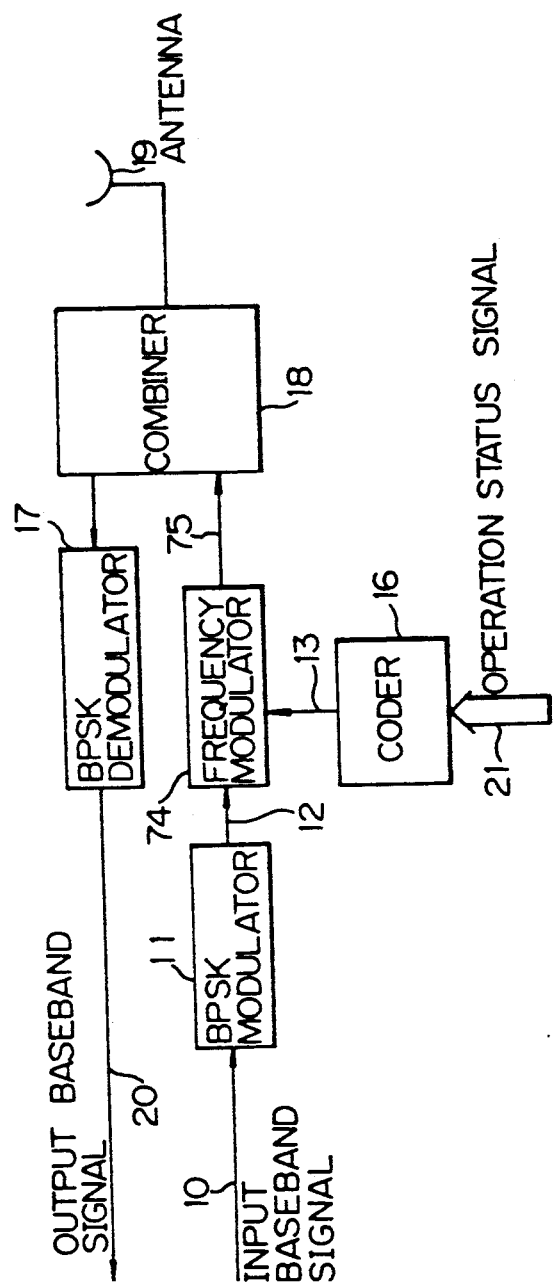
FIG. 9 is a block diagram of still another small earth station according to the present invention.

FIG. 9 is still another block diagram of a small earth station, in which the primary modulation is BPSK, and the secondary modulation is FSK (digital phase shift keying). The primary modulation is of course not restricted BPSK, but multi-PSK (MPSK) is possible. In the Figure, the numeral 74 is a frequency modulator which shifts the carrier frequency of the output of the BPSK modulator 12 to $f_0+\Delta f$ or $f_0-\Delta f$ based upon '1' or '0' of the signal 13. The numeral 75 is an output of the frequency modulator 74. $f_0$ is the carrier frequency of the BPSK modulator 11. Other numerals in FIG. 9 are the same as those in FIG. 2.

Figure 10:
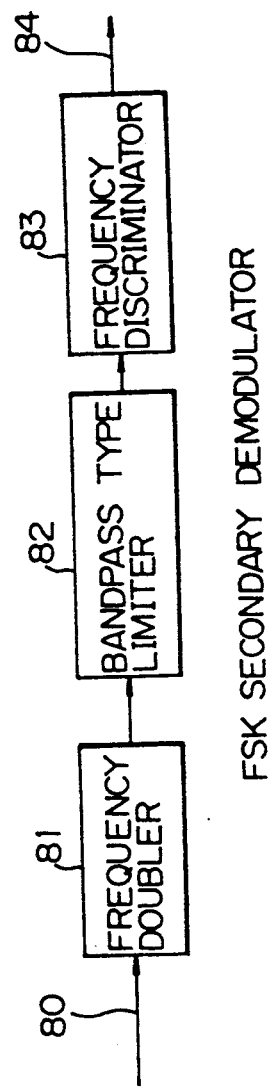
FIG. 10 is a block diagram of still another secondary demodulator which is used with the small earth station of FIG. 9.

FIG. 10 is a block diagram of FSK demodulator for secondary demodulation, in which the numeral 80 is hybrid modulation signal from the small earth stations 3-8, 81 is a frequency doubler for removing BPSK component, 82 is a bandpass type amplitude limiter which includes a bandpass filter for selecting double frequency component appeared at the output of the frequency doubler 81, an amplitude limiter for limiting the amplitude of the same, and the numeral 83 is a frequency discriminator, and 84 is an output signal of the frequency discriminator 83. The output signal 84 relates to either $+\Delta f$ or $-\Delta f$. Thus, the baseband signal is demodulated.

EMBODIMENT 4

Figure 11:
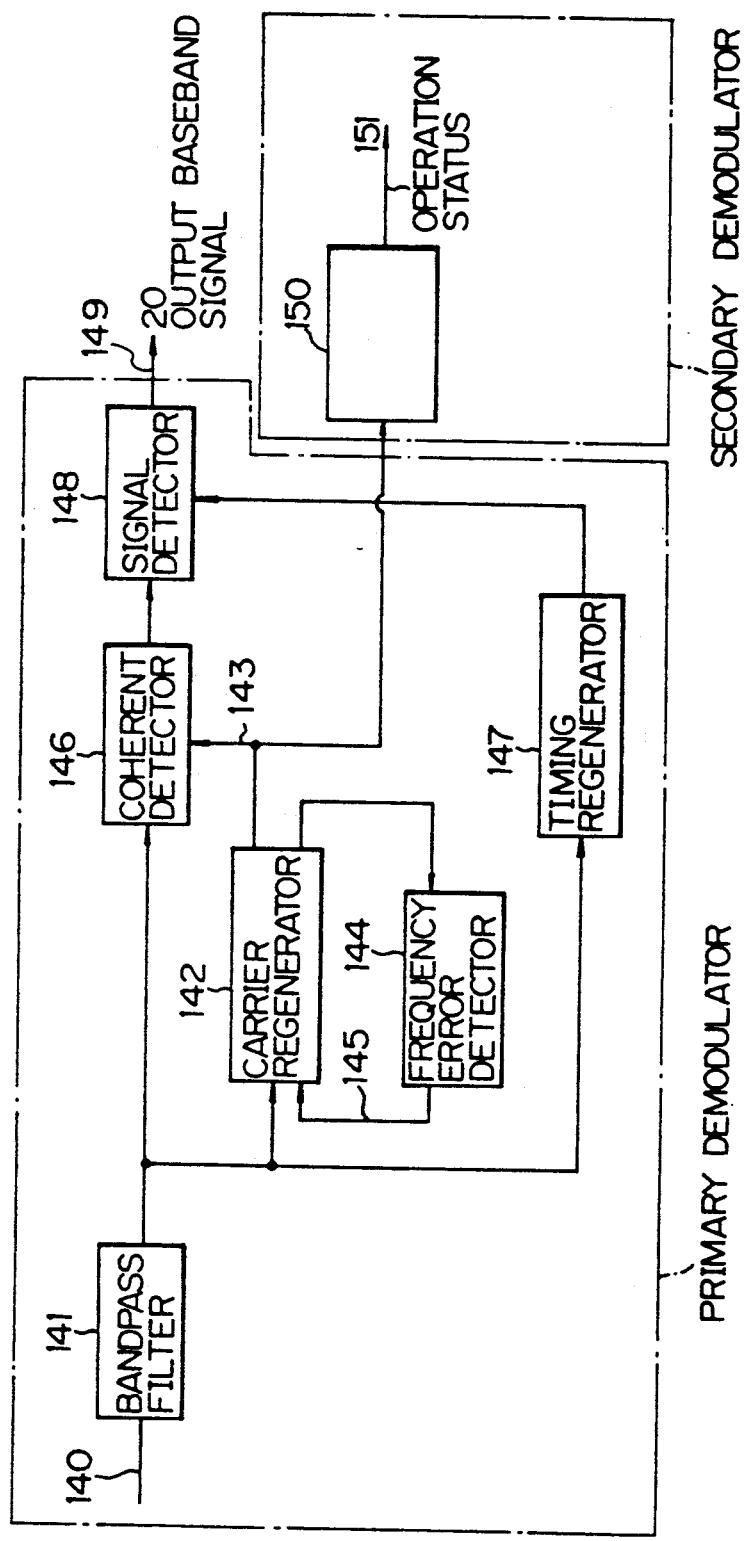
FIG. 11 is a block diagram of a hybrid demodulator according to the present invention.

FIG. 11 is a block diagram of a secondary demodulator for demodulating a hybrid modulation signal with multiphase PSK primary modulation, and PSK secondary modulation. In the Figure, the numeral 140 is an input signal which is hybrid modulation signal, 141 is a bandpass filter for removing noise outside the passband, 142 is a carrier regenerator for providing a reference carrier for coherent detection, 143 is a reference carrier which is the output of said circuit 142, 144 is a frequency error detector for sensing frequency offset of an input signal, 145 is an output signal of the circuit 144, 146 is a phase detector for a primary modulation signal, 147 is a timing regeneration circuit, 148 is a signal detector, 149 is an output signal of the signal detector 148, and 150 is a phase detector for secondary modulation signal composed of for instance phase lock loop (PLL).

In FIG. 11, the input signal 140 is the signal as shown in FIG. 3b or FIG. 3c. The frequency error detector 144 provides the frequency offset $\Delta f$ $(=2\theta/T)$, and $-\Delta f$ $(=-2\theta/T)$ depending upon '1' and '0' of the secondary modulation signal, where T is the period of the secondary modulation signal. The carrier regeneration circuit 142 provides the carrier frequency which carries $f_0+\Delta f$ and $f_0-\Delta f$ to the phase detector 146 controlled by the output of the frequency error detector 144. When the receive frequency shifts from $f_0$ by $+\Delta f$, the error component which is proportional to $\Delta f$ appears at an output 145, and the carrier regenerator provides the regenerated frequency $f_0+\Delta f$, which is applied to the phase detector 146 for primary modulation, and the phase detector 150 for secondary modulation. The output 151 of the phase detector 150 is proportional to the phase shift of the secondary modulation signal, and shows the operation status of small earth stations.

As a modification, the phase detector 150 would be replaced by a polarity sensor with the input of the same coupled with the output of the frequency error detector 144. Since the output of the frequency error detector 144 relates to f or -f, the detection of mere polarity or sign is enough for secondary demodulation.

When the secondary modulation is FSK, the secondary demodulator 151 is implemented by the configuration of FIG. 8 or FIG. 10, respectively. In the case of ASK, the secondary demodulator consisting of only a level detector which is the same as 63 in FIG. 8 needs to be connected at the output of the coherent detector 146.

EMBODIMENT 5

Figure 12:
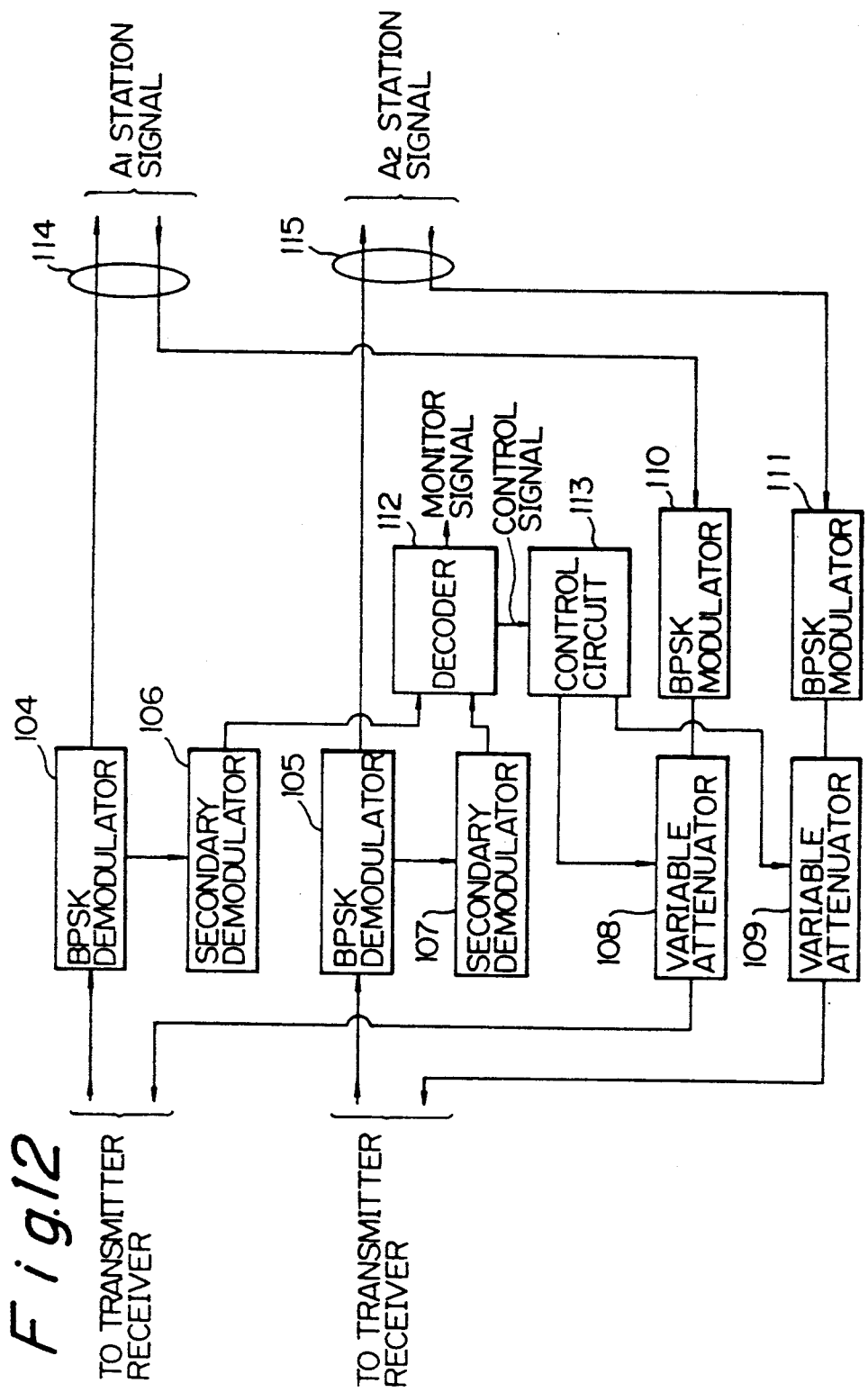
FIG. 12 is a block diagram of a terminal earth station in the satellite communication system according to the present invention.

FIG. 12 is a block diagram of a relay earth station. The apparatus of FIG. 12 is used not only in a relay earth station, but also in a large terminal earth station which communicates with small earth stations through a satellite.

In the Figure, the modulation part comprises BPSK modulators 110, 111, and variable attenuators 108, 109 for adjusting transmit power. The demodulation part comprises the BPSK demodulators 104, 105, and the secondary demodulators 106, 107 for demodulating secondary modulation signal. The output of the secondary demodulators 106 and 107 are fed to the decode circuit 112 which deframes the multiplexed signal to provide the operation status information including the receive C/N, bit error rate (BER), et al in the small earth stations. Some operation status signals (receive C/N and/or bit error rate) are applied to the control circuit 113, which adjusts the variable attenuators 108, 109 so that the transmit power is adjusted in order to compensate for the rain attenuation. It should be noted that the rain attenuation is measured in a small earth station side, the measured information is transmitted to a relay earth station having recourse to hybrid modulation, and the relay earth station adjusts transmit power to the small earth station. Thus, the rain attenuation at a small earth station is compensated for controlling transmit power of the relay earth station. The structure of the BPSK demodulators 104, 105, and the secondary demodulators 106, 107 are shown in FIG. 11.

The outputs of the BPSK demodulators 104 and 105 are receive data of the $A_1$ station (small earth station), and $A_2$ station (small earth station), respectively, and the transmit signals to those stations are applied to the BPSK modulators 110, and 111, respectively. The output of the decode circuit 112 provides the monitoring information of the operation status of the small earth stations.

EMBODIMENT 6

FIG. 13 shows a block diagram of a relay earth station 2 in FIG. 1. The apparatus of FIG. 13 functions to control transmit power from the relay earth station to a small station according to received signal quality at each small earth station. The receive quality at each small earth station is informed to the relay earth station using hybrid modulation signal through the satellite.

It is assumed that the relay earth station in FIG. 13 connects the small earth stations 3, 4, and 5 to the small earth stations 6, 7 and 8, through the satellite 1. In FIG. 13, the numerals 220-222, and 220'-222' are receive signals from the small earth stations 3-8, respectively. The numerals 223-225, and 223'-225' are secondary demodulators for secondary demodulation of PSK, ASK or FSK signal. The numerals 226-228 and 226'-228' are BPSK demodulators for primary modulation signals, 229-231 and 229'-231' are PSK modulators to modulate the output of said BPSK demodulators, 232-234 and 232'-234' are variable attenuators, 235-237 and 235'-237' are outputs of the variable attenuators, 238 is a control circuit of the variable attenuators, and 256 and 256' are decoding circuits for secondary modulation signals. The decoding circuits 256 and 256' function to de-frame the multiplexed signal which includes the operation status of each small earth station. The structure of each of the BPSK demodulators 226-228 and 226'-228', and the structure of each of the secondary demodulators 223-225 and 223'-225' are shown in FIG. 11, FIG. 4, FIG. 8, or FIG. 10.

The outputs 253-255 and 253'-255' of the secondary demodulators 223-225 and 223'-225' are decoded by the decode circuits 256 and 256', respectively. The decoded output which is used for the power control is applied to the control circuit 238, which adjusts the variable attenuators 232-234 and 232'-234' by comparing the reference receive quality with the measured receive quality from the decode circuits 256 and 256' so that the difference between said reference receive quality and said measured receive quality decreases.

The digital baseband signal in a primary modulation is demodulated by the BPSK demodulators 226-228 and 226'-228', and the demodulated signal is again modulated by the modulators 229-231 and 229'-231' so that the re-modulated signal is forwarded to the small earth stations 3-8 through the variable attenuators 232-234 and 232'-234', the transmitters (not shown), and the satellite 1.

Thus, in a satellite communication system among small earth stations 3-8 through a relay earth station 2, and a satellite 1, each small earth station measures the received signal quality, and the measured data is transmitted to the relay earth station by hybrid modulation in which the modulation signal modulated by the information signal is re-modulated by the measured signal quality. The relay earth station controls the transmit power to each small earth station according to the measured signal quality forwarded from each earth station. Therefore, the signal quality at each small earth station is kept at a predetermined value.

The present invention is applicable to conventional earth stations with small change in apparatuses, and not only the power control, but also the monitor of operation status of the small earth stations are possible. The only change to a conventional communication apparatus to use the present invention is to insert a secondary modulator in IF (intermediate frequency stage) of a small earth station.

In FIG. 13, an input of the secondary demodulators 223, 224 and 225 are connected to an input signal directly. As a modification, that input of the secondary demodulators may be coupled with outputs of the related primary demodulators.

From the foregoing it will now be apparent that a new and improved satellite communication monitoring system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. Hybrid modulation satellite communication system, comprising:
   a satellite;
   relay earth station;
   a plurality of small earth stations operably coupled with one another through said satellite and said relay earth station,
   each of said plurality of small earth stations having smaller antenna and weaker transmit power than those of said relay earth station,
   each of said small earth stations having primary modulator means for receiving and modulating carrier wave based on a first information signal, and for transmitting a primary information signal therefrom,
   said relay earth station having first demodulator means for receiving and demodulating said primary information signal from said plurality of small earth stations,
   at least one of said small earth stations having a secondary modulator means for receiving said primary information signal from said primary modulator means and for secondary modulation of said primary information signal, wherein said secondary modulator means further receives a second information signal, wherein said secondary modulator means modulates said primary information signal based on said second information signal, wherein said second information signal includes operation status information, and wherein a secondary modulated signal outputted from said secondary modulator means carries said primary information signal and said secondary information signal, and
   said relay earth station further having a secondary demodulator means for receiving and demodulating said secondary modulated signal from said plurality of small earth stations.

2. Hybrid modulation satellite communication system according to claim 1, wherein said primary modulator means in each of said small earth stations is a BPSK modulator.

3. Hybrid modulation satellite communication system according to claim 1, wherein said primary modulator means in each of said small earth stations is a multiphase PSK modulator.

4. Hybrid modulation satellite communication system according to claim 1, wherein said secondary modulator means in each of said small earth stations is a PSK modulator.

5. Hybrid modulation satellite communication system according to claim 1, wherein said secondary modulator means in each of said small earth stations is an ASK modulator.

6. Hybrid modulation satellite communication system according to claim 1, wherein said secondary modulator means in each of said small earth stations is an FSK modulator.

7. Hybrid modulation satellite communication system according to claim 1, wherein said second information signal includes operation status of a small earth station including signal quality of a received signal from said satellite.

8. Hybrid modulation satellite communication system according to claim 7, wherein said relay earth station includes at least an attenuator at an output portion of a modulator means for adjusting transmit power to at least one of said small earth stations according to signal quality forwarded by said small earth station through secondary modulation.

9. Hybrid modulation satellite communication system according to claim 1, wherein said secondary demodulator means is a phase detector.

10. Hybrid modulation satellite communication system according to claim 1, wherein said secondary demodulator means is a polarity detector.

11. Hybrid modulation satellite communication system according to claim 4, wherein said secondary modulator means modulates by a phase shift of one of 45° and −45°.

* * * * *